(12) United States Patent
Park

(10) Patent No.: US 12,529,741 B2
(45) Date of Patent: Jan. 20, 2026

(54) METHOD TO IMPROVE UNIFORMITY OF MAGNETIZATION AND MR IMAGE AT 7T HUMAN MRIS

(71) Applicant: THE U.S.A, as represented by the Secretary, Department of Health and Human Services, Silver Spring, MD (US)

(72) Inventor: Bu S. Park, Bethesda, MD (US)

(73) Assignee: United States of America, as represented by the Secretary, Department of Health and Human Services, Silver Spring, MD (US)

( * ) Notice: Subject to any disclaimer, the term of this patent is extended or adjusted under 35 U.S.C. 154(b) by 146 days.

(21) Appl. No.: 18/559,316

(22) PCT Filed: May 9, 2022

(86) PCT No.: PCT/US2022/028348
§ 371 (c)(1),
(2) Date: Nov. 6, 2023

(87) PCT Pub. No.: WO2022/236171
PCT Pub. Date: Nov. 10, 2022

(65) Prior Publication Data
US 2024/0241201 A1 Jul. 18, 2024

Related U.S. Application Data

(60) Provisional application No. 63/186,007, filed on May 7, 2021.

(51) Int. Cl.
*G01R 33/54* (2006.01)
*G01R 33/561* (2006.01)
*G01R 33/565* (2006.01)

(52) U.S. Cl.
CPC ....... *G01R 33/543* (2013.01); *G01R 33/5612* (2013.01); *G01R 33/5659* (2013.01)

(58) Field of Classification Search
CPC .............. G01R 33/543; G01R 33/5612; G01R 33/5659
See application file for complete search history.

(56) References Cited

U.S. PATENT DOCUMENTS 6,064,203 A * 5/2000 Bottomley ............. G01R 33/50
324/309
2012/0019247 A1* 1/2012 Boernert .............. G01R 33/288
324/309

(Continued)

OTHER PUBLICATIONS

"Novel Method to Improve the Uniformity of 7T Body MR Images", Concepts in Magnetic Resonance Part B: Magnetic Resonance Engineering, vol. 2021, May 6, 2021 (May 6, 2021), pp. 1-9 (Year: 2021).*

(Continued)

*Primary Examiner* — Akm Zakaria
(74) *Attorney, Agent, or Firm* — Klarquist Sparkman, LLP

(57) ABSTRACT

A measurement volume is divided into multiple regions of interest (ROIs) and RF shimming parameters are independently selected for each of the ROIs. The ROIs have dimensions based on an RF wavelength in a specimen (i.e., based on RF frequency and specimen dielectric constant) and are selected to reduce wavelength-based nonuniformity in specimen excitation. For a multi-segment RF coil having segments situated about a cylindrical surface, ROI shapes include cylinders and cylindrical shells aligned along a coil axis.

21 Claims, 7 Drawing Sheets

(56) References Cited

U.S. PATENT DOCUMENTS

| | | |
|---|---|---|
| 2015/0212171 A1 | 7/2015 | Hebrank et al. |
| 2015/0226823 A1 | 8/2015 | Speier et al. |
| 2022/0155395 A1* | 5/2022 | Johnson ............. G01R 33/5608 |
| 2023/0124954 A1* | 4/2023 | Özarslan ................ G01R 33/58 |
| | | 324/309 |

OTHER PUBLICATIONS

Park et al., "Novel Method to Improve the Uniformity of 7T Body MR Images," Concepts in Magnetic Resonance Part B, pp. 1-9 (2021).

Ladd et al., "Pros and cons of ultra-high-field MRI/MRS for human application," Progress in Nuclear Magnetic Resonance Spectroscopy, 109: 1-50 (2018).

International Search Report and Written Opinion for International Application No. PCT/US2022/028348, 20 pages, dated Aug. 5, 2022.

\* cited by examiner

FIG. 4
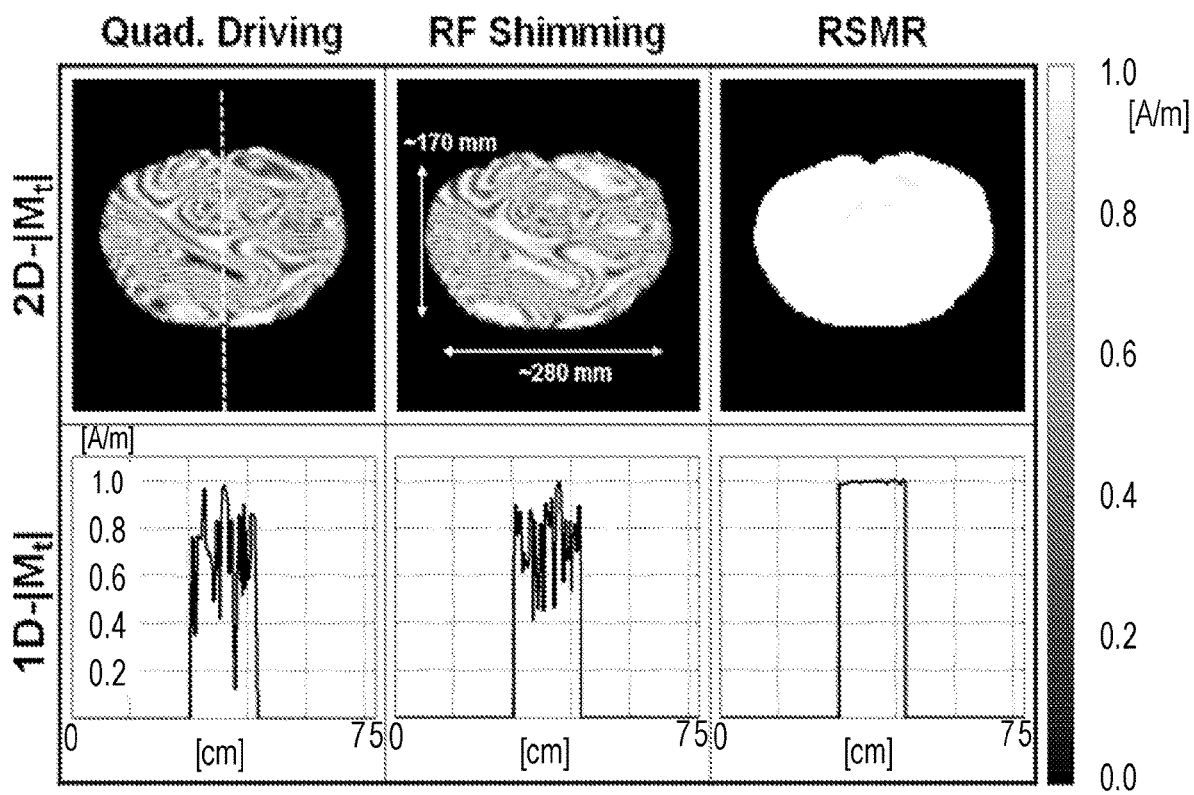
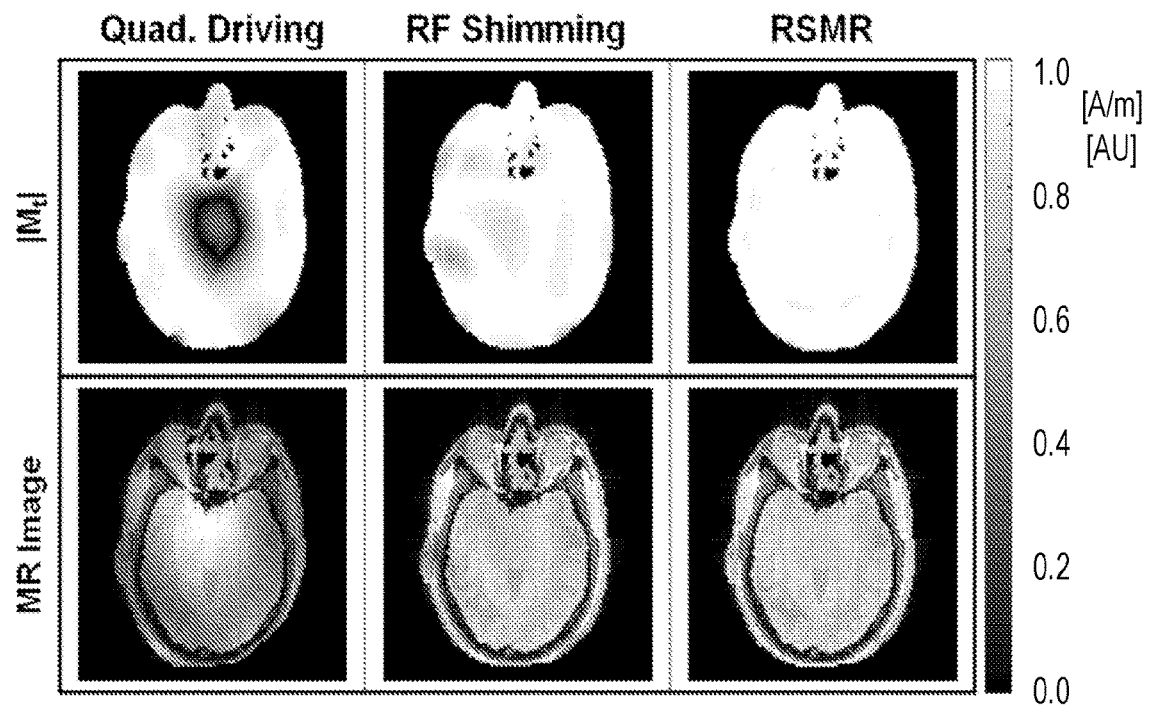
FIG. 5

METHOD TO IMPROVE UNIFORMITY OF MAGNETIZATION AND MR IMAGE AT 7T HUMAN MRIS

CROSS REFERENCE TO RELATED APPLICATION

This is the U.S. National Stage of International Application No. PCT/US2022/028348, filed May 9, 2022, which was published in English under PCT Article 21(2), which in turn claims the benefit of U.S. Provisional Application No. 63/186,007, filed May 7, 2021, which is incorporated by reference herein in its entirety.

FIELD

The disclosure pertains to magnetic resonance imaging.

BACKGROUND

To acquire magnetic resonance (MR) images of high resolution and increased signal-to-noise ratio (SNR), a high static magnetic field ($|B_0|$) is needed. This is because the intrinsic SNR (ISNR) in magnetic resonance imaging (MRI) is proportional to the square of $|B_0|$(ISNR∝$|B_0|^2$). However, as $|B_0|$ is increased, the absorbed power increases significantly and magnetic field inhomogeneity caused by a wavelength effect results in decreased image intensity uniformity. These effects are significant in the imaging of human tissue using 7 T MRI systems, the highest field approved for MRI by the FDA. Many different methods have been studied to solve the issues of image uniformity and absorbed power of high-field MRIs. Some examples include multichannel excitation using a shielded birdcage coil, use of transmit arrays with radiofrequency (RF) shimming, composite pulses or spoke pulses, different transmit RF coil designs, high dielectric constant (HDC) materials, and simultaneous transmit excitation of phased array and volume coils. Conventional approaches exhibit limitations on making uniform RF magnetic fields and image intensity when the size of an imaging region is large enough to cover one wavelength ($\lambda$) and $|B_0|$ is >3 T. Thus image nonuniformity is evident for whole body MR images at 7 T or higher field strengths. Alternative approaches are needed.

SUMMARY

Disclosed herein are methods and apparatus that can provide more uniform transmit RF-magnetic fields ($B_1$-fields) than conventional approaches, even with static fields as high as 7 T or more. A volume in which a specimen is situated is divided into multiple regions of interest (ROIs) having dimensions based on a wavelength associated with the RF pulses used to produce the transmit B-fields. The ROIs are typically arranged along an axis associated with an RF coil used to produce the transmit B-field or in any other way as necessary to reduce wavelength-dependent nonuniformity. Images of specimen portions in each of the ROIs are obtained with respective RF excitations and ROI-specific RF shimming. The images can include specimen portions exterior to an ROI and these portions can be removed before ROI images are combined to produce a specimen image. Typically, RF shimming is customized for each ROI and ROI dimensions are selected based on an average dielectric constant associated with specimens of interest.

The foregoing and other objects, features, and advantages of the invention will become more apparent from the following detailed description, which proceeds with reference to the accompanying figures.

BRIEF DESCRIPTION OF THE DRAWINGS

FIG. 4 illustrates numerical simulation results of two dimensional (2D)-$|M_t|$ (first row) and corresponding ID profiles (second row) using a human model and three different optimization methods at 7.0 T.

FIG. 5 illustrates numerical calculation results for $|M_t|$ (first row) and MR images (second row) for 7.0 T head imaging with the three different optimization methods based on the experimentally acquired rotating RF magnetic field ($B_1^+$) and head MR image of each channel. An 8-channel transmit array with an ID of 246 mm and a length of 214 mm was used. The unit of scale bar is [A/m] for $|M_t|$ and arbitrary units (A.U.) for the MR images.

FIG. 7A illustrates an acquisition method based on one $|M_t|$ distribution. FIG. 7B illustrates an alternative method based on multiple $|M_t|$ distributions to reduce scanning time.

DETAILED DESCRIPTION

Introduction

Figure 1:
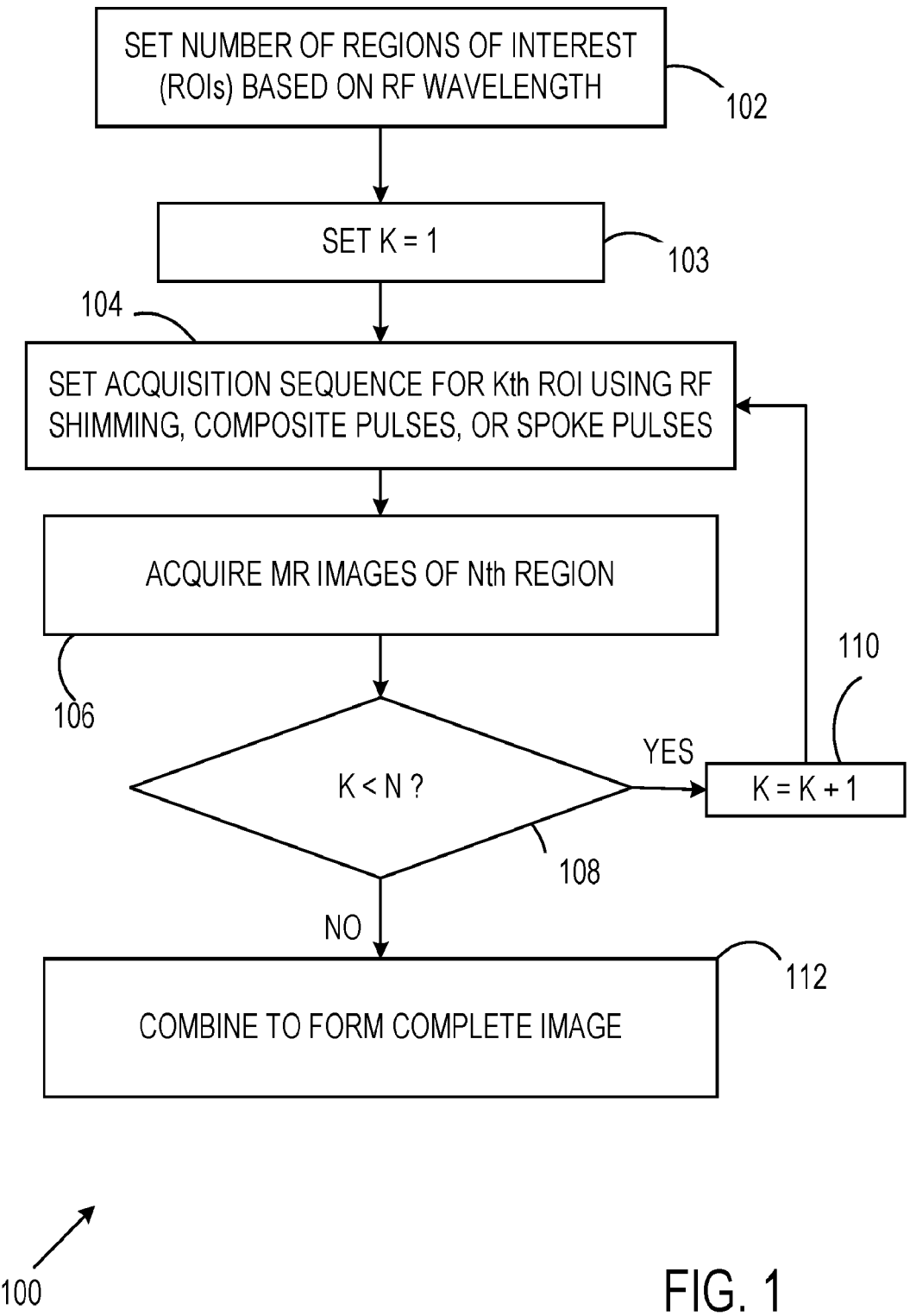
FIG. 1 illustrates a representative method of acquiring MR images using multiple ROIs having at least one dimension selected based on RF wavelength.

The wavelength of electromagnetic fields is decreased inside the human body because of an increased $\varepsilon_r$ value ($\lambda \propto 1/\sqrt{\varepsilon_r}$) compared to $\lambda$ in free space. Specifically, the dielectric constant $\varepsilon_r$ of average human muscle is 63.9 at 128 MHz and 59.0 at 300 MHz, whereas $\varepsilon_r$ is 1 in free space at any frequency. Therefore, an electromagnetic field wavelength in average human muscle is 0.29 m at 128 MHz and 0.13 m at 300 MHz, whereas it is 2.34 m at 128 MHz and 1.0 m at 300 MHz in free space. Therefore, it is challenging to make a uniform RF magnetic field inside the human body given the decreased $\lambda$.

The maximum size of a region over which RF magnetic fields and associated image intensities are uniform at 7.0 T is generally less than or approximately equal to one wavelength of the RF excitation. However, the waist size of an average man is about 0.83~0.99 m (the diameter is about 0.26~0.32 m assuming a cylinder shape), which is larger than one wavelength at 7.0 T for the necessary RF excitations. Therefore, it is difficult to make uniform magnetic fields and image intensities for whole human body imaging at 7.0 T.

This disclosure describes approaches to improving uniformity of an applied RF magnetic field using RF shimming with multiple ROIs (RSMR) to improve corresponding MR image uniformity. The approaches are particularly advantageous at high static $B_0$ values such as at 7 T. Specifically, if a volume of interest for imaging is larger than one wavelength, the volume is divided into multiple ROIs. After such division, independent optimization techniques including RF shimming are applied to each region to improve RF magnetic field uniformity and image uniformity. The RSMR approach has been simulated using finite difference time domain (FDTD) numerical simulations and the Bloch equation-based MRI simulator.

General Considerations and Terminology

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items unless otherwise indicated.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

As used herein, "image" refers to a displayed view of a specimen such as presented on a display device as well as stored data that can be used to produce displayed images such as digital data stored in non-transitory computer readable media as, for example, JPG, TIFF, BMP or other formats.

A radio-frequency pulse applied to specimens in MR measurements has a wavelength in the specimen that is a functions of RF frequency and specimen dielectric constant at the RF frequency. Regions of interest (ROIs) are selected to have dimensions that are less than 0.1, 0.2, 0.5, 0.75, or about one wavelength, wherein the term about refers to values that are less than 5, 10, or 20% different. In the examples, RF frequency (and wavelength) is fixed, but in some applications, RF frequency can be varied so that ROIs of other dimensions can be selected. ROI dimensions can be selected individually for each specimen or can be selected and fixed based on expected characteristics. For example, an MRI system for human imaging can be used with a fixed set of ROIs based on a customary range of patient characteristics. In other examples, a preliminary specimen image can be used to determine ROIs. In the examples, RF wavelength $$\lambda = \frac{c}{f\sqrt{\mu_r \varepsilon_r}},$$

wherein c is the speed of light, f is the RF operating frequency, $\mu_r$ is relative magnetic permeability, and $\varepsilon_r$ is relative dielectric permittivity. The relative magnetic permeability $\mu_r$ is about 1 inside a human body but the relative permeability $\varepsilon_r$ of average human muscle is 63.9 at 128 MHz and 59.0 at 300 MHz in contrast to 1 in free space at any frequency. Therefore, one wavelength of the RF pulse field in human muscle is about 0.29 m at 128 MHz and about 0.13 m at 300 MHz, in contrast to the free space wavelengths of 2.34 m at 128 MHz and 1.0 m at 300 MHz, respectively. Thus, for imaging of human patients, the RF wavelengths are shorter than patient dimensions.

The approaches disclosed herein are in some examples discussed with reference to large static axial magnetic fields ($B_0$) such as 1 T, 2 T, 3 T, 4 T, 5 T, 6 T, 7 T, or more. The disclosed approaches are suitable for arbitrary $B_0$ values but tend to be more useful with large B-fields due to the higher Larmor frequencies which are proportional to a product of gyromagnetic ratio and $|B_0|$ and the associated need for higher RF excitation frequencies and shorter excitation wavelengths. Currents or voltages applied to RF coils to produce RF pulses (and transmitted B-fields) are referred to herein as drive signals or RF drive signals. Image acquisition pulse sequences of various types can be used and RF pulses can be individually selected for each ROI to reduce wavelength dependent variations. In some cases, RF pulses are selected based in part on characteristics of a specimen and are referred to as specimen-specific. This selection can permit compensation and adjustment using variations in dielectric constant in one or more specimens. Images for each of a plurality of ROIs can be combined to form a specimen image and, in some cases, such images are processed to remove image portions that extend beyond the associated ROI. Combining RF shimming with multiple ROIs is referred to herein as RSMR.

Example 1. Representative Method

Referring to FIG. 1, a representative method 100 includes selecting regions of interest (ROIs) at 102 to provide suitable RF pulse uniformity. ROI dimensions are selected to be less than 0.1, 0.2, 0.5, 0.75, or 1.0 times an RF wavelength that is a function of both RF frequency and specimen dielectric constant. At 103, a counter K is initialized and at 104 an acquisition sequence for a Kth ROI is selected using, for example, RF shimming, spoke RF pulses, composite pulses, or others. At 106, an image of the Kth ROI is obtained using the selected acquisition sequence and RF pulse. At 108 it is determined if measurements are to be made for additional ROIs. If so, at 110, the counter K is incremented and the method returns to 104. If all ROIs have been measured, at 112, the images of the ROIs are combined to produce a specimen image. In FIG. 1, acquisition sequences and procedures are selected serially in response to selection of an ROI, but these sequences and procedures can be determined upon initial selection of the ROIs.

Example 2. Representative Implementation and Evaluation

Figures 2A, 2B, 2C:
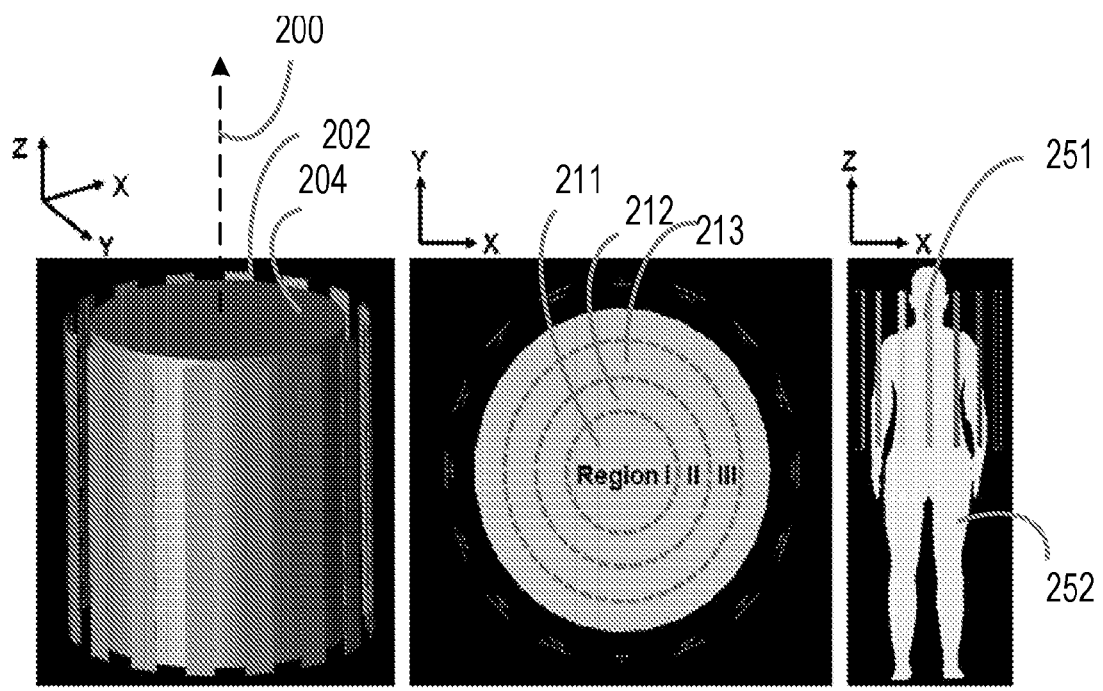
FIG. 2A illustrates a 16-channel transmit array having an interior diameter (ID) of 620 mm and a length of 620 mm and a cylindrical uniform phantom used in examples and having an ID of 540 mm, and a length of 620 mm, conductivity σ=0.79 S/m, relative permittivity or dielectric constant $\varepsilon_r$=59.0 (average muscle at 300 MHz) at 7.0 T.
FIG. 2B illustrates multiple ROIs selected based on RF wavelength and electromagnetic properties of the sample.
FIGS. 2C-2D illustrate the ROIs and the transmit array shown with respect to a human body.
Figure 2D:
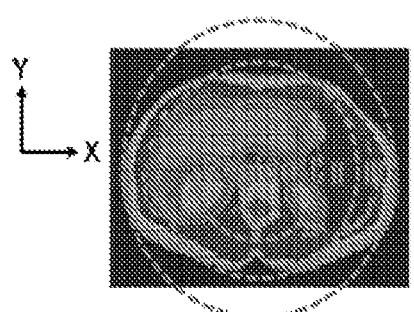
Figure 2E:
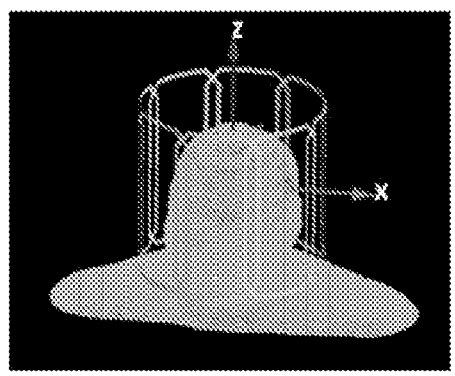
FIG. 2E illustrates placement of a 6-channel transmit array for head imaging using multiple ROIs.

Referring to FIG. 2A, a representative multi-segment RF coil includes segments such as representative segment 202 that are situated along an axis 200. In this example, the segments are arranged along a cylindrical surface and are shown situated about a phantom 204. As shown in FIG. 2B, the volume about the phantom 204 is divided into ROIs 211-213 (Regions I, II, II) that extend along the axis 200 that is parallel to a z-axis. The ROIs 212-213 are cylindrical shells (cylindrical shell ROIs) situated about the cylindrical ROI 211. In this example, the RF pulse is applied so that wavelength-dependent pulse magnitude variations in a transmitted B-field are transverse to a z-axis (parallel to the axis 200) and dimensions of these ROIs are selected based RF pulse wavelength and specimen (in this case, phantom) dielectric constant. Because of the cylindrical shape of the RF coil, the ROIs tend to be cylinders or cylindrical shells. FIG. 2C illustrates an RF coil having a representative segment 251 placed with respect to a human shape 252. In this example, a 16 element RF coil is used for both transmit and receive. FIG. 2D shows placement of the ROIs 211-213 with respect to a patient. FIG. 2E illustrates placement of a 6-channel (i.e., 6 segment) transmit array for head imaging using multiple ROIs.

Figure 3A:
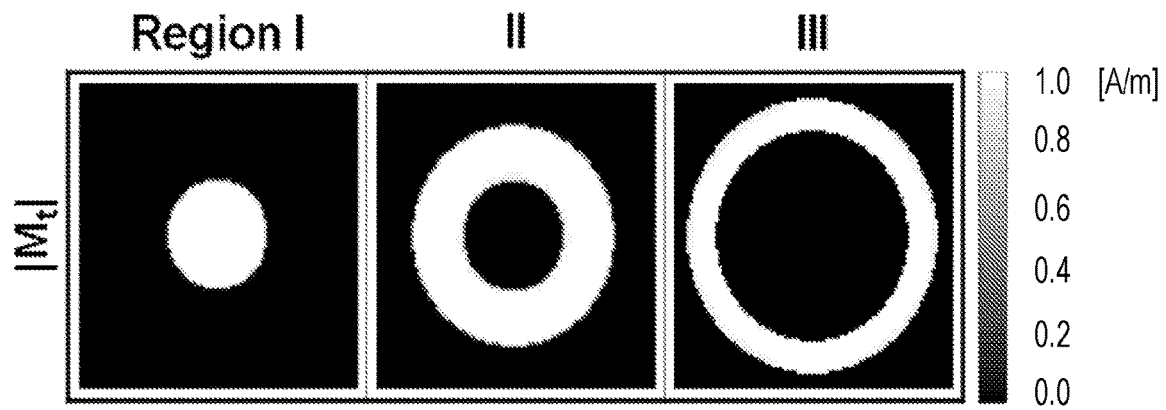
FIG. 3A illustrates numerical simulation results of transverse magnetization ($|M_t|$) with multiple ROIs and RF shimming for regions such as illustrated in FIG. 2B. Region I has an ID of 100 mm, Region II has an ID of 100 mm and an outer diameter (OD) of 200 mm, and Region III has an ID of 200 mm and an OD of 260 mm.
Figure 3B:
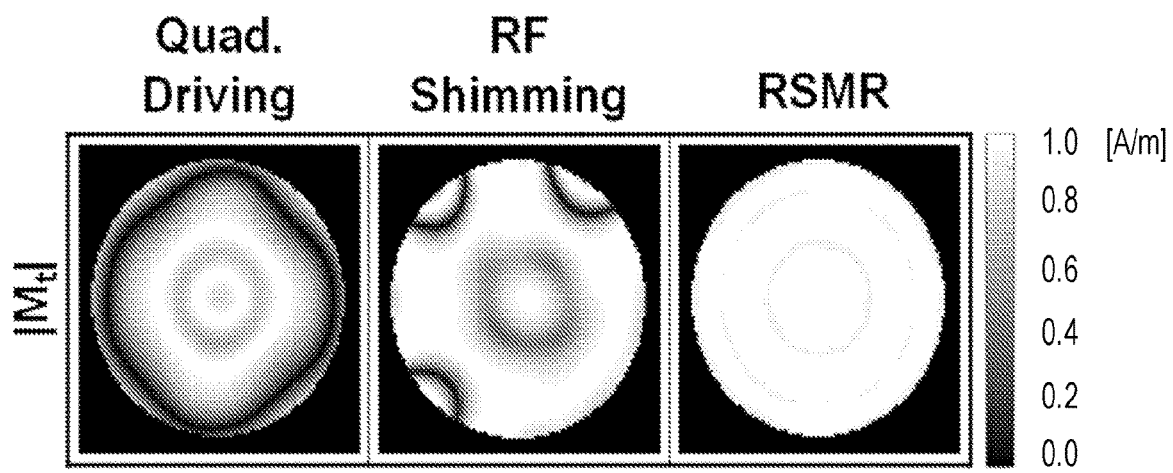
FIG. 3B illustrates numerical simulation results for $|M_t|$ with three different methods of transmit array optimization, i.e., quadrature driving (first column), RF shimming without multiple ROIs (second column), and RF shimming with multiple ROIs (RSMR) (third column) using the cylindrical phantom at 7.0 T.

FIG. 3A illustrates numerical simulation results for transverse magnetization ($|M_t|$) produced with multiple ROIs and RF shimming for regions such as illustrated in FIG. 2B. Cylindrical region I has an ID of 100 mm, cylindrical shell region II has an ID of 100 mm and an outer diameter (OD) of 200 mm, and cylindrical shell region III has an ID of 200 mm and an OD of 260 mm. RF shimming is independently adjusted for each of these regions. FIG. 3B illustrates numerical simulation results for $|M_t|$ with three different methods of transmit array optimization, i.e., quadrature driving (first column), RF shimming without multiple ROIs (second column), and RF shimming with multiple ROIs (RSMR) (third column) using the cylindrical phantom at 7.0 T. The RSMR result is a combination of images obtained by individual acquisitions associated with each of the three regions.

FIG. 4 illustrates numerical simulation results of two dimensional (2D)-$|M_t|$ (first row) and corresponding 1D profiles (second row) using a human model and three different optimization methods at 7.0 T. As in FIGS. 3A-3B, the simulation results are based quadrature driving, RF shimming, and RF shimming using multiple ROIs (RSMR).

FIG. 5 illustrates numerical calculation results for $|M_t|$ (first row) and MR images (second row) for 7.0 T head imaging with the three different optimization methods based on the experimentally acquired rotating RF magnetic field ($B_1^+$) and head MR image of each channel. An 8-channel transmit array with an ID of 246 mm and a length of 214 mm was used. The unit of scale bar is [A/m] for $|M_t|$ and arbitrary units (A.U.) for the MR images. As in the previous examples, numerical calculations were done for quadrature driving, RF shimming, and RF shimming using multiple ROIs (RSMR).

Example 3. Representative MRI Apparatus

Figure 6:
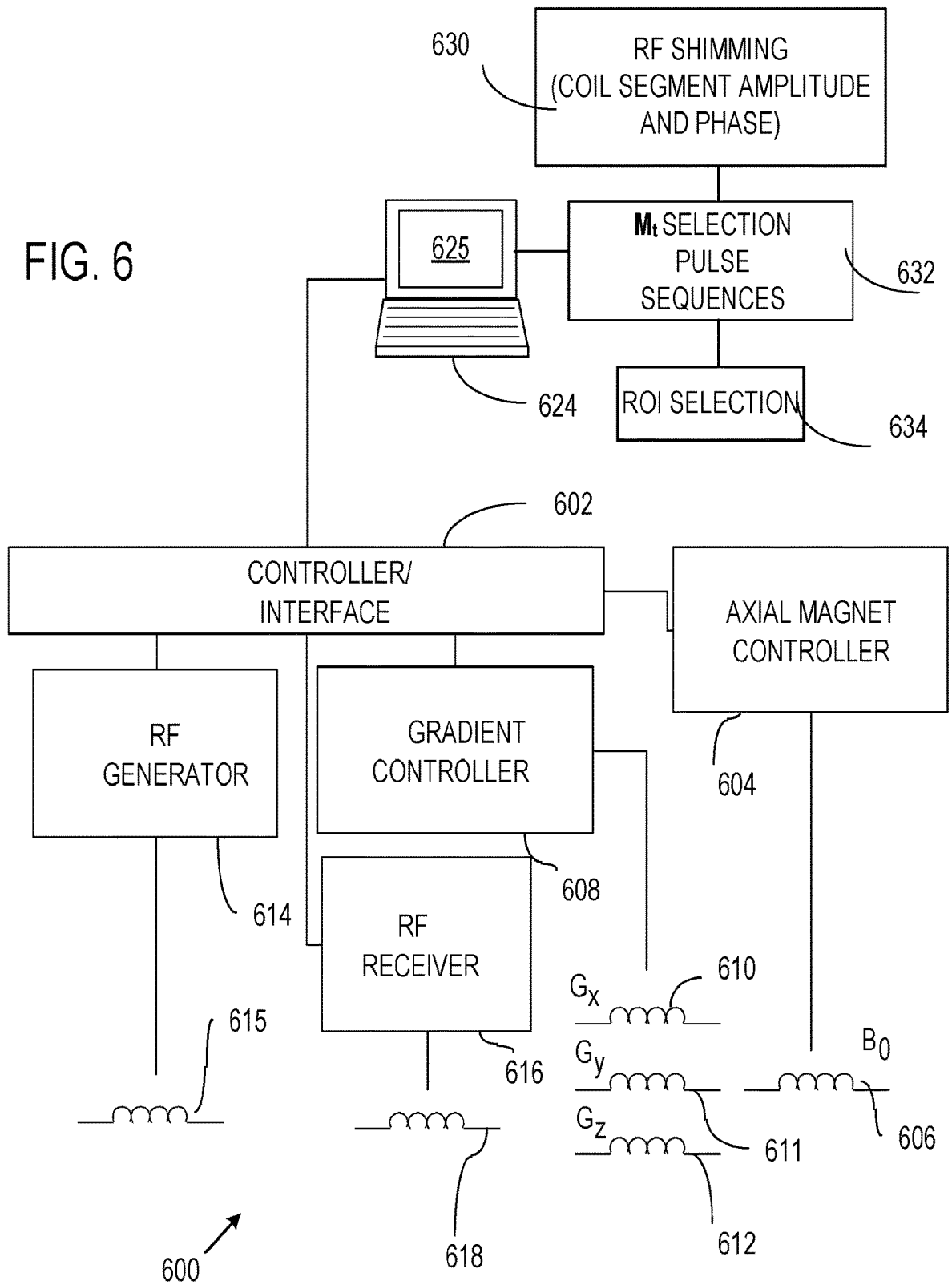
FIG. 6 is a block diagram of a representative magnetic resonance imaging (MRI) system configured for acquiring and combining images for multiple regions of interest.

MR signals that are modeled as described above can be obtained using an MRI apparatus 600 as illustrated in FIG. 6. The apparatus 600 includes a controller/interface 602 that can be configured to apply selected magnetic fields to a specimen. An axial magnet controller 604 is in communication with an axial magnet 606 that is generally configured to produce a substantially constant magnetic field $B_0$. A gradient controller 608 is configured to apply a constant or time-varying gradient magnetic field in a selected direction or in a set of directions using magnet coils 610-612 to produce respective magnetic field gradient vector components Gx, Gy, Gz or combinations thereof. An RF generator 614 is configured to deliver one or more RF pulses to a specimen using a transmitter coil 615. An RF receiver 616 is in communication with a receiver coil 618 and is configured to detect or measure net magnetization of spins. Slice selection gradients can be applied with the same hardware used to apply the diffusion gradients. In this example, receiver and transmitter coils are shown as separate for convenient illustration but a single coil can be used. Coils can have multiple segments as mentioned above.

A computer 624 or other processing system such as a personal computer, a workstation, a personal digital assistant, laptop computer, smart phone, or a networked computer can be provided for data acquisition, control and/or analysis as well as selection of ROIs and combining images. The computer 624 generally includes a hard disk, a removable storage medium such as a floppy disk or CD-ROM, and other memory such as random access memory (RAM). Computer-executable instructions for data acquisition or control can be provided on a floppy disk or other non-transitory storage medium or delivered to the computer 624 via a local area network, the Internet, or other network. Signal acquisition, instrument control, and signal analysis can be performed with distributed processing. For example, signal acquisition and signal analysis can be performed at different locations. As shown, memory portions 630, 632, 634 store and communicate processor executable instructions for RF shimming such as selection of coil segment drive amplitude and phase, selection of pulse sequences, and ROI selection, respectively.

Figure 6A:
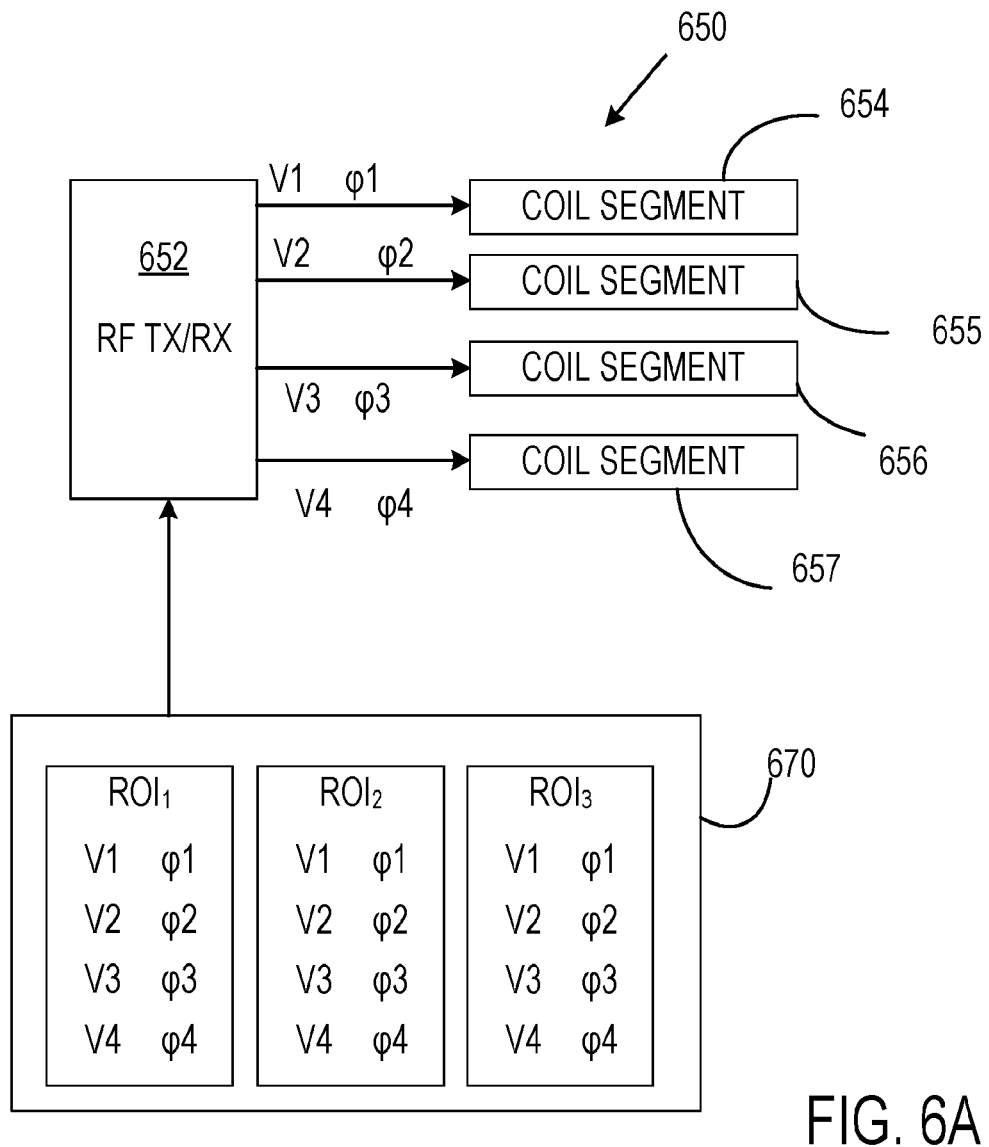
FIG. 6A is a schematic representation of a multi-segment RF coil and an associated RF receiver/transmitter. The magnitude and phase of an input pulse for measurements of each ROI can be different so that input pulses for an N-segment coil and M ROIs ($ROI_1, \ldots, ROI_M$), wherein N and M are positive integers, are described as ($V_1^1$, $\varphi_1^1, \ldots, V_N^1, \varphi_N^1$) ... ($V_1^M, \varphi_1^M, \ldots, V_N^M, \varphi_N^M$) for $ROI_1, \ldots, ROI_M$, respectively, wherein $V_i^j$, $\varphi_i^j$ denote pulse amplitude and phase, respectively for an $i^{th}$ coil segment as used in measurement of the $j^{th}$ ROI.

FIG. 6A illustrates a representative multi-segment RF coil 650 that includes segments 654-657 that are coupled to an RF transmitter 652 for use in RF shimming. In FIG. 6A, the RF transmitter 652 is also shown as a receiver to indicate that in some cases, the multi-segment RF coil 650 serves as both a transmit and a receive coil. The RF transmitter 652 is arranged to provide RF drive signals to the coil segments with respective phases ($\varphi 1$-$\varphi 4$) and amplitudes (V1-V4) that can be independently selected to establish a satisfactory transmit $B_1$ fieldS in a specimen. The magnitude and phase of an input pulse for measurements of each ROI can be different so that input pulses for an N-segment coil and M ROIs ($ROI_1, \ldots, ROI_M$), wherein N and M are positive integers, are described as $(V_1^1, \varphi_1^1, \ldots, V_N^1, \varphi_N^1), \ldots, (V_1^M, \varphi_1^M, \ldots, V_N^M, \varphi_N^M)$ for $ROI_1, \ldots, ROI_M$, respectively, wherein $V_i^j, \varphi_i^j$ denote pulse amplitude and phase, respectively for an $i^{th}$ coil segment as used in measurement of the $j^{th}$ ROI. As shown above, RF transmit coils can have numerous segments, including sixteen segments. Phases and amplitudes for each coil segment can be selected for excitation of each ROI to produce an intended (typically uniform) transmit field. A memory device 670 stores phases $\varphi 1$-$\varphi 4$ and amplitudes V1-V4 of drive signals for RF coil segments for each of three ROIs in this example, but more or fewer ROIs can be used.

Example 4. Alternative Image Acquisitions with Multiple ROIs

Figures 7A, 7B:
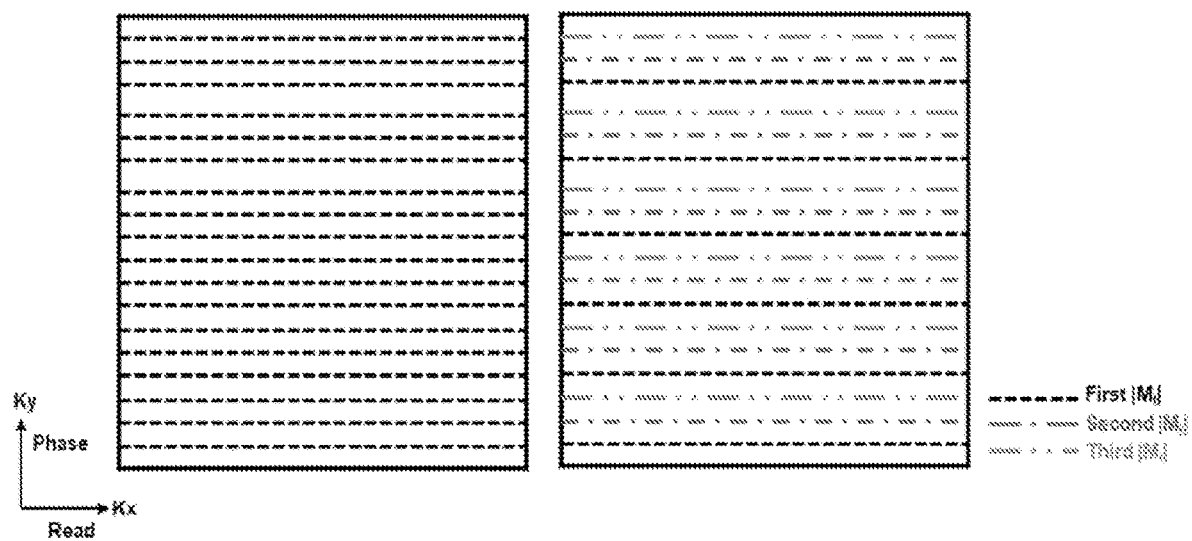
FIGS. 7A-7B illustrate different K-space data acquisition methods.

Obtaining multiple images associated with ROIs can increase image acquisition time. One approach to reducing acquisition time is illustrated in FIGS. 7A-7B. In FIG. 7A, a complete k-space scan of each ROI is obtained, tripling acquisition time. To speed up image acquisition, as shown in FIG. 7B, only selected portions of k-space are scanned for each ROI; in this example, there are three ROIs and each is scanned with ⅓ of the k-space scan lines used in FIG. 7A. This reduces imaging time to substantially same as with a single ROI but with improved image uniformity. The ROI-based approaches can be used with conventional parallel imaging methods, including sensitivity encoding (SENSE), generalized auto-calibrating partially parallel acquisitions (GRAPPA), and compressed sensing, and/or decreased number of averages in the imaging parameters because of the higher SNR at 7.0 T MRI compared to lower $|B_0|$ MR systems, e.g., 1.5 T and 3.0 T.

ADDITIONAL EXAMPLES

Example 1 is a method of magnetic resonance imaging (MRI), including: based on a wavelength of radio-frequency (RF) pulses to be applied to a specimen and a specimen dimension, selecting at least two regions of interest (ROIs); establishing MRI pulse sequences for each of the at least two ROIs, the MRI pulse sequences including RF pulses associated with a wavelength of the RF pulses; and applying the established MRI pulse sequences to the specimen to obtain respective images for each of the at least two ROIs.

Example 2 includes the subject matter of Example 1, and further specifies that the wavelength of the RF pulses is determined from a frequency of the RF pulses and a dielectric constant associated with the specimen at the frequency of the RF pulses.

Example 3 includes the subject matter of any of Examples 1-2, and further specifies that portions of the established MRI pulse sequences for the at least two ROIs are alternately applied to the specimen.

Example 4 includes the subject matter of any of Examples 1-3, and further specifies that image data for each of the at least two ROIs is obtained for different k-space values.

Example 5 includes the subject matter of any of Examples 1-4, and further specifies that image data for each of the ROIs is obtained using the same k-space values.

Example 6 includes the subject matter of any of Examples 1-5, and further specifies that the ROIs include a cylindrical ROI and at least one cylindrical shell ROI situated about the cylindrical ROI.

Example 7 includes the subject matter of any of Examples 1-6, and further specifies that the ROIs include a cylindrical ROI, a first cylindrical shell ROI situated about and extending radially outward from an axis of the cylindrical ROI, and a second cylindrical shell ROI situated about and extending radially outward from the first cylindrical shell ROI.

Example 8 includes the subject matter of any of Examples 1-7, and further specifies that the cylindrical ROI has a diameter that is less than one-half of the wavelength of the RF pulses.

Example 9 includes the subject matter of any of Examples 1-8, and further specifies that thicknesses of the first and second cylindrical shell ROIs are less than one-half of the wavelength of the RF pulses.

Example 10 includes the subject matter of any of Examples 1-9, and further includes combining the images for each of the at least two ROIs to produce a specimen image, wherein the ROIs can have arbitrary shapes.

Example 11 includes the subject matter of any of Examples 1-10 and further includes combining images for each of the at least two ROIs with an arbitrary shape and data acquired using arbitrary distributed multiple RF coil channels to produce a specimen image.

Example 12 is a magnetic resonance imaging system, including: an RF transmit coil operable to apply an RF pulse to a specimen; an RF receive coil operable to receive a magnetic resonance signal in response to the RF pulse from the RF transmit coil; and a controller operable to assign a plurality of regions of interest (ROIs) and obtain images associated with each of the plurality of ROIs based on the received magnetic resonance signal.

Example 13 includes the subject matter of Example 12, and further specifies that the controller is further operable to produce a specimen image by combining the images associated with each of the plurality of ROIs.

Example 14 includes the subject matter of any of Examples 12-12, and further specifies that the images associated with each of the plurality of ROIs include exterior portions associated with specimen portions outside of the respective ROIs, and further includes removing the exterior portions prior to combining the images.

Example 15 includes the subject matter of any of Examples 12-13, and further specifies that the controller is operable to provide different RF pulses to the specimen for each of the plurality of ROIs.

Example 16 includes the subject matter of any of Examples 12-14, and further specifies that the RF transmit coil is a multi-segment coil that includes a plurality of segments, and the different RF pulses for each of the ROIs are associated with differing amplitudes or phases of drive signals supplied to at least some of the segments.

Example 17 includes the subject matter of any of Examples 12-15, and further specifies that the different RF pulses for each of the plurality of ROIs are specimen specific.

Example 18 includes the subject matter of any of Examples 12-16, and further specifies that the images associated with each of the plurality of ROIs are based on different k-space scans.

Example 19 includes the subject matter of any of Examples 12-17, and further specifies that the plurality of ROIs includes a cylindrical ROI and at least a first cylindrical shell ROI region situated about and extending radially outward from the cylindrical ROI.

Example 20 includes the subject matter of any of Examples 12-18, and further specifies that RF coil is a cylindrical multi-segment coil and the cylindrical ROI and at least the first cylindrical shell ROI extend along an axis of the multi-segment coil.

Example 21 includes the subject matter of any of Examples 12-19 and further specifies that the cylindrical ROI has a diameter that is less than one-half of a wavelength of the RF pulses and a thickness of the first cylindrical shell ROI is less than one-half of the wavelength of the RF pulses.

In view of the many possible embodiments to which the principles of the disclosed technology may be applied, it should be recognized that the illustrated embodiments are only preferred examples of and should not be taken as limiting the scope of the disclosure.

I claim:

1. A method of magnetic resonance imaging (MRI) a specimen, comprising:
    selecting at least two regions of interest (ROIs) of the specimen having dimensions based on a wavelength of RF pulses to be applied to the specimen, wherein the dimensions are less than the wavelength;
    establishing MRI pulse sequences for each of the at least two ROIs, the MRI pulse sequences including RF pulses associated with the wavelength; and
    applying the established MRI pulse sequences to the specimen to obtain respective images for each of the at least two ROIs.

2. The method of claim 1, wherein the wavelength of the RF pulses is determined from a frequency of the RF pulses and electromagnetic properties including a dielectric constant associated with the specimen at the frequency of the RF pulses.

3. The method of claim 1, wherein portions of the established MRI pulse sequences for the at least two ROIs are alternately applied to the specimen.

4. The method of claim 1, wherein image data for each of the at least two ROIs is obtained for different k-space values for each of the at least two ROIs.

5. The method of claim 1, wherein image data for each of the at least two ROIs is obtained using the same k-space values for each of the at least two ROIs.

6. The method of claim 1, wherein the at least two ROIs include a cylindrical ROI and at least one cylindrical shell ROI situated about the cylindrical ROI.

7. The method of claim 1, wherein the at least two ROIs include a cylindrical ROI, a first cylindrical shell ROI situated about and extending radially outward from an axis of the cylindrical ROI, and a second cylindrical shell ROI situated about and extending radially outward from the first cylindrical shell ROI.

8. The method of claim 7, wherein the cylindrical ROI has a diameter that is less than one-half of the wavelength associated with the RF pulses.

9. The method of claim 8, wherein thicknesses of the first and second cylindrical shell ROIs are less than one-half of the wavelength of the RF pulses.

10. The method of claim 1, further comprising combining the images for each of the at least two ROIs to produce a specimen image.

11. The method of claim 1, wherein each of the at least two ROIs has a different shape, and further comprising combining the images for each of the at least two ROIs produce a specimen image.

12. The method of claim 11, further comprising combining the images for each of the at least two ROIs to produce a specimen image,
    wherein the images are acquired using distributed multiple RF coil channels from a multi-segment coil.

13. A magnetic resonance imaging system, comprising:
    an RF transmit coil operable to apply RF pulses to a specimen;
    an RF receive coil operable to receive a magnetic resonance signal in response to the RF pulses from the RF transmit coil; and
    a controller operable to assign a plurality of regions of interest (ROIs) in the specimen and obtain images associated with each of the plurality of ROIs based on the received magnetic resonance signal, wherein the controller is operable to provide RF pulses having different wavelengths to the specimen for each of the plurality of ROIs, each of the wavelengths of the RF pulses determined from a frequency of the RF pulses and electromagnetic properties including a dielectric constant associated with the specimen at the frequency of the RF pulses.

14. The magnetic resonance imaging system of claim 13, wherein the controller is further operable to produce a specimen image by combining the images associated with each of the plurality of ROIs.

15. The magnetic resonance imaging system of claim 14, wherein the images associated with each of the plurality of ROIs include exterior portions associated with specimen portions outside of the respective ROIs, and further comprising removing the exterior portions prior to combining the images.

16. The magnetic resonance imaging system of claim 13, wherein the RF transmit coil is a multi-segment coil that includes a plurality of segments, and the different RF pulses for each of the plurality of ROIs are associated with respective drive signals to at least some of the segments, wherein different drive signals have differing amplitudes, differing phases, or both differing amplitudes and different phases.

17. The magnetic resonance imaging system of claim 16, wherein the different RF pulses for each of the plurality of ROIs are specimen specific.

18. The magnetic resonance imaging system of claim 13, wherein the images associated with each of the plurality of ROIs are based on respective scans of different portions of k-space.

19. The magnetic resonance imaging system of claim 13, wherein the plurality of ROIs includes a cylindrical ROI and at least a first cylindrical shell ROI region situated about and extending radially outward from the cylindrical ROI.

20. The magnetic resonance imaging system of claim 19, wherein RF coil is a cylindrical multi-segment coil and the cylindrical ROI and at least the first cylindrical shell ROI extend along an axis of the multi-segment coil.

21. The magnetic resonance imaging system of claim 19, wherein the cylindrical ROI has a diameter that is less than one-half of the wavelengths of the RF pulses and a thickness of the first cylindrical shell ROI is less than one-half of the wavelengths of the RF pulses.

* * * * *